United States Patent Office 3,809,580
Patented May 7, 1974

3,809,580
BATTERY SEALING AND COMPONENT
CONNECTING METHOD
Bruce E. Jagid, Whitestone, N.Y., assignor to Power
Conversion, Inc., Tuckahoe, N.Y.
Filed June 1, 1971, Ser. No. 148,458
Int. Cl. H01m 1/02
U.S. Cl. 136—133                                    7 Claims

ABSTRACT OF THE DISCLOSURE

A non-aqueous hermetically sealed battery cell comprising an electrode assembly and an anhydrous liquid electrolyte is formed by necking a metal casing, closed at one end, a predetermined distance from the other end and seating upon said neck an assembly including a thrust ring, an insulating member, and a metal cap. The open end is then uniformly upset or crimped to bear upon said insulating member and cap, thereby hermetically sealing the assembly. A feature of the invention calls for the passing of an electrode-coupled conductor between the thrust ring and neck prior to upset to thereby form a mechanically and electrically secure electrode contact. The battery is filled with electrolyte through a nipple in the cap which is then cold welded.

This invention relates generally to the hermetic sealing of battery cells and in particular to an arrangement for simultaneously insuring against the release of battery electrolyte and gases, and insulating the positive from the negative terminals.

The art is replete with arrangements for hermetically sealing and simultaneously insulating the opposite terminals of a battery. Recent advances in the battery art, however, have led to significantly more stringent sealing requirements. These recent innovations include cells having electrolytes such as ammonia and sulfur dioxide with high vapor pressure gases. Complications arise because of the subjection of such batteries to storage at temperatures anywhere between those naturally occurring in the arctic and those at the equator, thereby multiplying included gas pressures.

With respect to such cells, even the most advanced of the conventional sealing arrangements has proved to be hermetically ineffective. One such arrangement which is reliable for more conventional battery types (and even alkaline and nickel cadmium batteries) includes a necked tube, the necking part acting as a rim upon which the metal cover and an overlapping insulating collar are tightly clamped by a crimped or deformed casing edge. U.S. Pat. No. 3,279,953 relates to a further improvement which effects a projection of the necking both inwardly and towards the crimped end. This is achieved by precise non-symmetrical necking dimensions. While such advances suffice for some purposes, I have found them ineffective for the mass production of the described non-aqueous batteries. In these cells, ammonia and sulfur dioxide diffuse easily and the best available sealing techniques can achieve a leakage rate for a standard C-cell of 50 milligrams of $SO_2$ per day at room temperature. While this is not significant in the case of a single cell, a warehouse of such cells generates gas at an intolerable level. Use of the inventive technique has been found to reduce leakage to $\frac{1}{100}$ this rate at a temperature which is substantially elevated (70° C.). At room temperature, the seal is effectively hermetic and leakage is difficult to measure.

Accordingly, it is the object of this invention to provide a highly reliable insulating and virtually hermetic seal for use on cylindrical battery casings to prevent the escape of high vapor pressure gases such as ammonia and sulfur dioxide.

It is a further object of this invention to provide a seal for the aforementioned purpose which is inexpensive as to materials, relatively non-critical as to tolerance, and easily formed using mass production techniques.

It is a further object of this invention to provide such a seal without obviating the use of conventional electrolyte filling techniques.

Briefly, the invention is predicated upon the concept of initially seating a thrust ring upon the neck portion of a metallic tube casing, thereby obviating any close tolerance requirements directed to the neck itself, it being sufficient if the ring, under the pressure to be applied, cannot be forced past the neck. The crimping or deforming of the outer casing end over the insulator is then effected at an acute angle to the axis, whereby the end flange is not only inward, but is downward towards the closed end of the casing. With such an arrangement, increased gas pressure creates a greater bite in the insulator rather than any movement of the component parts and consequent release of gas.

It is a feature of the invention that since the entire seal is now substantially effected at the extreme end, it is possible to use the crimping pressure to simultaneously effect an electrical contact between the shell neck and the thrust ring, thereby obviating conventional welding techniques employed to electrically and mechanically connect one electrode to the shell. Because the invention requires little to no modification of the cap, it is possible to use a nipple cap allowing the battery to be filled by injection and sealed by conventional cold weld techniques.

The above mentioned and other features and objects of this invention and the manner of attaining them will become more apparent and the invention itself will best be understood by reference to the following description of an embodiment of the invention taken in conjunction with the accompanying drawings, the description of which follows, wherein FIG. 1 is a sectional view of the battery components positioned prior to fill and prior to deformation of the open end;

Figure 1:
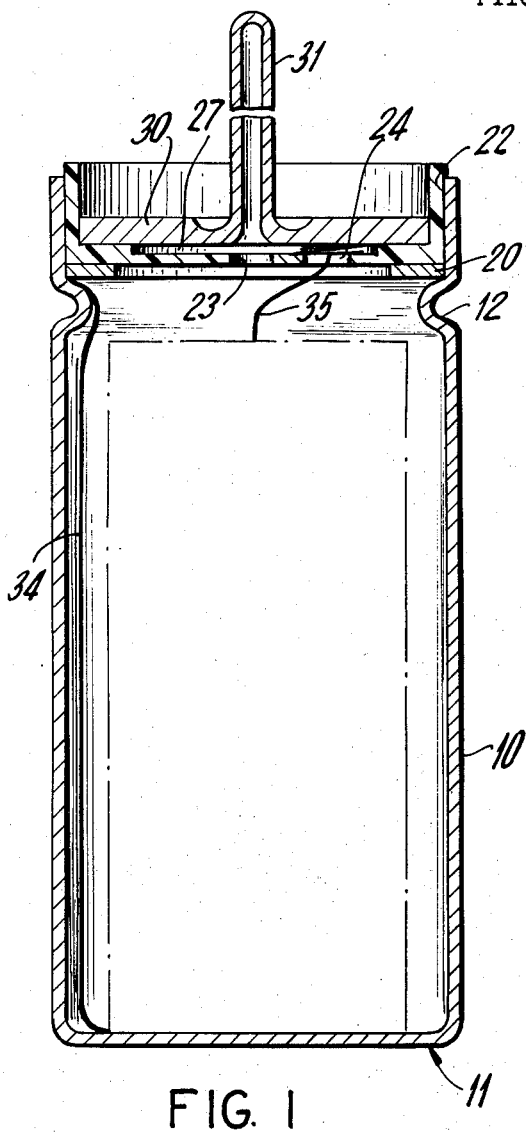
Figure 2:
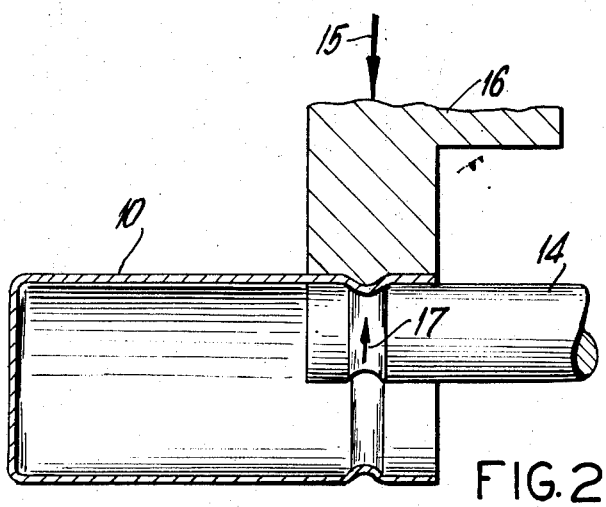
FIG. 2 illustrates one arrangement for forming the neck portion of the battery case.

Turing now to FIG. 1, the positioned components may be seen prior to the deformation or crimping of the outer edge of the battery case. The battery shell 10 comprises a cylindrical metal casing colsed at one end 11 and including a neck 12 formed a predetermined distance from the other or open end. Neck 12 may be easily formed as shown in FIG. 2 by the use of male and female dies 14 and 16, respectively, urged in the directions of the arrows 15 and 17 while being rotated about the axis of the shell. Preferably, the shell is a low carbon cold rolled steel. An exemplary thickness for such a casing is 19/1000 inches, and requires a die pressure of several hundred pounds force to effect the desired necking.

The thrust ring 20 is dimensioned to be slidably received in the open end of the cell casing and to rest upon the necked portion 12. The thrust ring is preferably metallic so that it is (a) light and strong, providing a good thrust bearing surface, and (b) so that it forms a good electrical contact. A preferred outside ring diameter is a few thousandths smaller than the inside diameter of the cell casing. As may be seen, thrust ring 20 serves as a platform for the cup shaped sealing member 22. Sealing and insulating member 22 includes a pair of slots 23 and 24, the former being centrally disposed to permit injected entry of electrolyte into the cell, and the latter being provided for passage of an electrode lead 35. Recess 27 accommodates conventional accordian pleats in the electrode contact 35 so that it is provided thrust pressure upon the metal cap 30 when the assembly has ultimately been crimped or deformed to produce the hermetic seal. Thus, sealing member 22 simultaneously serves as the hermetic sealing material and the electrical insulator between the electrically negative cell casing 10 and the electrically positive cell cap 30.

As may be seen, the sealing member extends slightly beyond the end of the casing to ensure that upon the crimping or deformation of the latter, the casing 12 will not contact the cap 30. Cap 30 includes a nipple 31 through which the electrolyte is passed once the battery is hermetically sealed.

An exemplary electrode assembly and electrolyte (shown only in phantom in FIG. 1) includes the following components in jelly roll fashion. The negative electrode comprises a lithium metal pressed onto a fine copper screen (anecter) which is separated from the cathode by a separator of porous polyethylene. Such a separator, in addition to providing inter-electrode insulation, permits adequate access of the electrolyte to the electrode faces and enables the ionic transport within the cell. The cathode is a passive electrode formed of conductive carbon mixed with glass fibers and polytetrafluoroethylene which acts as a binder, the mixture being pressed into a fine aluminum screen which acts as a cathecter.

Lead wires 34 and 35, which are preferably flat and elongated, are led respectively between the casing neck 12 and thrust ring 20 and through aperture 24 where it is accordian pleated by conventional means where it is welded to cap member 30.

The preferred anhydrous liquid electrolyte comprises a solvent liquid sulfur dioxide and a cosolvent anhydrous organic liquid such as methylformate. One mol of lithium bromide is dissolved in the electrolyte. The electrolyte solution is pressure injected into the cell through nipple 31 in the conventional manner once the hermetic seal has been effected (as will be explained).

Once the seal components have been positioned as shown in FIG. 1, the top portion of the casing is deformed inwardly and downwardly toward the closed end. We have found that in order to effect the highest possible degree of seal, it is desirable to deform the open end of the casing an angle delta of between 5° and 25°. An angle of 10° has proven most satisfactory and provides the optimum bite of the casing end into the insulating member 22.

Figure 3:
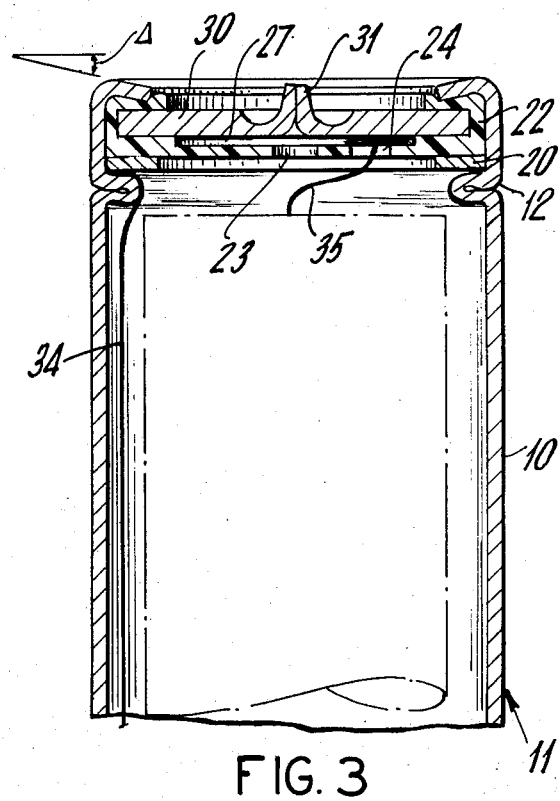
FIG. 3 is a sectional view of the sealed, filled battery cell.
Figure 4:
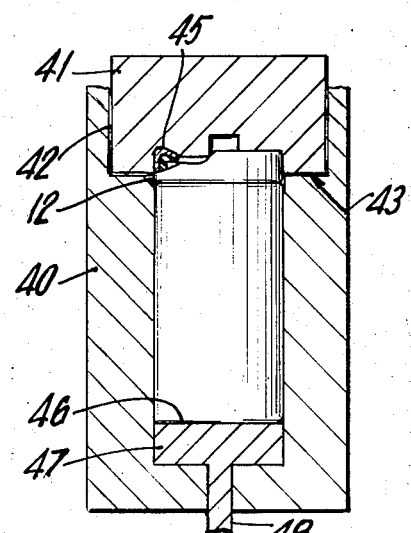
FIG. 4 illustrates, in partial section, an apparatus which may be utilized to uniformly deform the open end of the battery casing.

As may be seen by a comparison of FIGS. 1 and 3, deformation of the end has effected a collapse of the neck portion 12. This is not a requisite, but is preferable where the pressure contact is to be formed for electrode lead 34. One means for effecting such a collapse and simultaneously roll over the end to the desired angle is shown in FIG. 4. In FIG. 4, a pair of dies 40 and 41 are provided. The casing is placed in receiving die 40 and upsetting die 41 is placed over the open casing end and into the recess 42. With die 40 stabilized and pressure exerted on die 41, the dies are forced together until ultimately complete mating of the dies is effected as shown in the figure. When this position is reached, die 41 is seated upon the shoulder 43 of die 40.

The lower end of die 41 is preferably formed with an annular recess 45 which effects the desired deformation attitude (i.e. 10°). Since the total restraining force on the casing appears at the bottom 46, neck 12 collapses. It would be apparent to those skilled in the art that the same crimping or deformation of the open end may be effected without collapsing of the neck by supporting the shell at the neck during the deformation. Member 47 is provided to permit easy separation of the dies after the deforming operation by the tapping of its extended end 48.

I have found that the amount of force exerted on the plastic (insulating portion of the seal and, therefore, the degree of cell leakage suppression) is a function of the distance between the neck and the sealed end. It is thus relatively easily controlled.

Materials used for the seal should have a low vapor transmission rate with respect to the electrolyte materials and gases sealed therein and relatively low cold flow characteristics at elevated temperatures of for example +160° F. Exemplary materials are polypropylene, polyethylene, polysulfone, polyphenylene oxide, and other high temperature high density plastics.

While the principles of the invention have been described in connection with specific apparatus, it is to be clearly understood that this description is made only by way of example and not as a limitation to the scope of the invention.

What is claimed is:

1. A sealed battery cell including an electrode assembly of at least two opposite polarity electrodes and a high vapor pressure electrolyte comprising:
   a cylindrical metal casing closed at one end, open at the opposite end, and having a shallow necked portion at a predetermined distance from its open end;
   a rigid thrust ring providing a thrust bearing surface slidably engaged within said cylindrical casing and in axial and abutting relationship with said necked portion;
   a separate resilient annular sealing member in axial and in superposed abutting relationship with said thrust ring; and
   a metal cap disposed across the open end of said casing and hermetically seated along its outer periphery in a channel formed by said resilient sealing member, the open end of said metal casing being deformed uniformly inwardly to bear upon said sealing member, the latter being thus spatially stabilized by and pressed against a platform formed by said thrust ring, thereby sealing said battery against slow leakage of small quantities of said high vapor pressure electrolyte.

2. The sealed battery cell claimed in claim 1, wherein said sealing member comprises a disc having an aperture therein integral with the annular portion thereof.

3. The sealed battery cell claimed in claim 1, wherein the open end of said metal casing is deformed uniformly inwardly and at an acute angle to the casing axis, to thereby bite annularly into said sealing member.

4. The sealed battery cell claimed in claim 3, wherein said acute angle is between 65° and 85°.

5. The sealed battery cell claimed in claim 3, wherein said acute angle is approximately 80°.

6. The sealed battery cell claimed in claim 3, wherein said electrode assembly comprises a negative lead affixed thereto, said negative lead including a substantially flat elongated member disposed between said thrust ring and said neck, whereby an electrical pressure contact is formed between said electrode and the metal casing.

7. The sealed battery cell claimed in claim 6, wherein said metal cap comprises a nipple sealed by cold welding to permit the filling of said battery with electrolyte.

(References on following page)

References Cited

UNITED STATES PATENTS

| | | | |
|---|---|---|---|
| 3,185,594 | 5/1965 | Urry | 136—107 |
| 3,661,650 | 5/1972 | Flynn | 136—133 |
| 3,554,813 | 1/1971 | Feldhake | 136—133 |
| 3,475,226 | 10/1969 | Fraiolo | 136—162 |
| 3,573,990 | 4/1971 | Psuchida et al. | 136—107 |
| 3,622,392 | 11/1971 | Larsen | 136—107 |
| 3,056,849 | 10/1962 | Warren et al. | 136—83 R |
| 3,485,673 | 12/1969 | Jost | 136—102 |
| 3,413,154 | 11/1968 | Rao | 136—83 R |
| 2,669,597 | 2/1954 | Ruben | 136—107 |
| 2,771,381 | 11/1956 | Morehouse | 136—107 |
| 3,114,085 | 12/1963 | Ruscetta et al. | 136—133 |
| 2,592,439 | 4/1952 | Lee | 136—133 |
| 2,712,034 | 6/1955 | Seavey et al. | 136—133 |

ALLEN B. CURTIS, Primary Examiner

C. LEFEVOUR, Assistant Examiner